(12) United States Patent
Saukko et al.

(10) Patent No.: US 9,035,905 B2
(45) Date of Patent: May 19, 2015

(54) APPARATUS AND ASSOCIATED METHODS

(71) Applicant: Nokia Technologies Oy, Espoo (FI)

(72) Inventors: Jari Olavi Saukko, Tampere (FI); Marko Tapani Yliaho, Tampere (FI)

(73) Assignee: Nokia Technologies Oy, Espoo (FI)

( * ) Notice: Subject to any disclaimer, the term of this patent is extended or adjusted under 35 U.S.C. 154(b) by 166 days.

(21) Appl. No.: 13/720,205

(22) Filed: Dec. 19, 2012

(65) Prior Publication Data

US 2014/0168135 A1   Jun. 19, 2014

(51) Int. Cl.
| | |
|---|---|
| G06G 5/00 | (2006.01) |
| G06F 3/041 | (2006.01) |
| G06F 1/16 | (2006.01) |
| G06F 3/01 | (2006.01) |
| G06F 3/0488 | (2013.01) |
| H04M 1/725 | (2006.01) |

(52) U.S. Cl.
CPC .............. G06F 1/169 (2013.01); G06F 1/1684 (2013.01); G06F 3/011 (2013.01); G06F 2203/0383 (2013.01); G06F 2203/04104 (2013.01); H04M 2250/22 (2013.01); G06F 3/04886 (2013.01); H04M 1/72558 (2013.01); H04M 1/72577 (2013.01); H04M 2250/52 (2013.01); G06F 1/1692 (2013.01)

(58) Field of Classification Search
USPC ...................... 455/550.1, 569.1, 556.1, 575.1; 345/173–179, 156
See application file for complete search history.

(56) References Cited

U.S. PATENT DOCUMENTS

| | | | | |
|---|---|---|---|---|
| 8,725,197 | B2 * | 5/2014 | Alameh et al. | 455/550.1 |
| 2007/0036347 | A1 * | 2/2007 | Teicher | 379/418 |
| 2010/0079395 | A1 * | 4/2010 | Kim et al. | 345/173 |
| 2010/0151916 | A1 * | 6/2010 | Baek et al. | 455/567 |
| 2011/0312349 | A1 * | 12/2011 | Forutanpour et al. | 455/466 |
| 2012/0040711 | A1 | 2/2012 | Wong | |

FOREIGN PATENT DOCUMENTS

| | | |
|---|---|---|
| JP | 2007 081460 A | 3/2007 |
| JP | 2008 271062 A | 11/2008 |

OTHER PUBLICATIONS

Partial International Search Report for PCT/EP2013/076744 (undated).

* cited by examiner

*Primary Examiner* — Kent Chang
*Assistant Examiner* — Nelson Rosario
(74) *Attorney, Agent, or Firm* — Alston & Bird LLP

(57) ABSTRACT

An apparatus, the apparatus comprising at least one processor, and at least one memory including computer program code, the at least one memory and the computer program code configured, with the at least one processor, to cause the apparatus to perform at least the following: use a determined user's grip of a portable electronic device as a user input to the portable electronic device to control data streaming functionality provided using the portable electronic device.

17 Claims, 6 Drawing Sheets

Figure 1
Figure 3
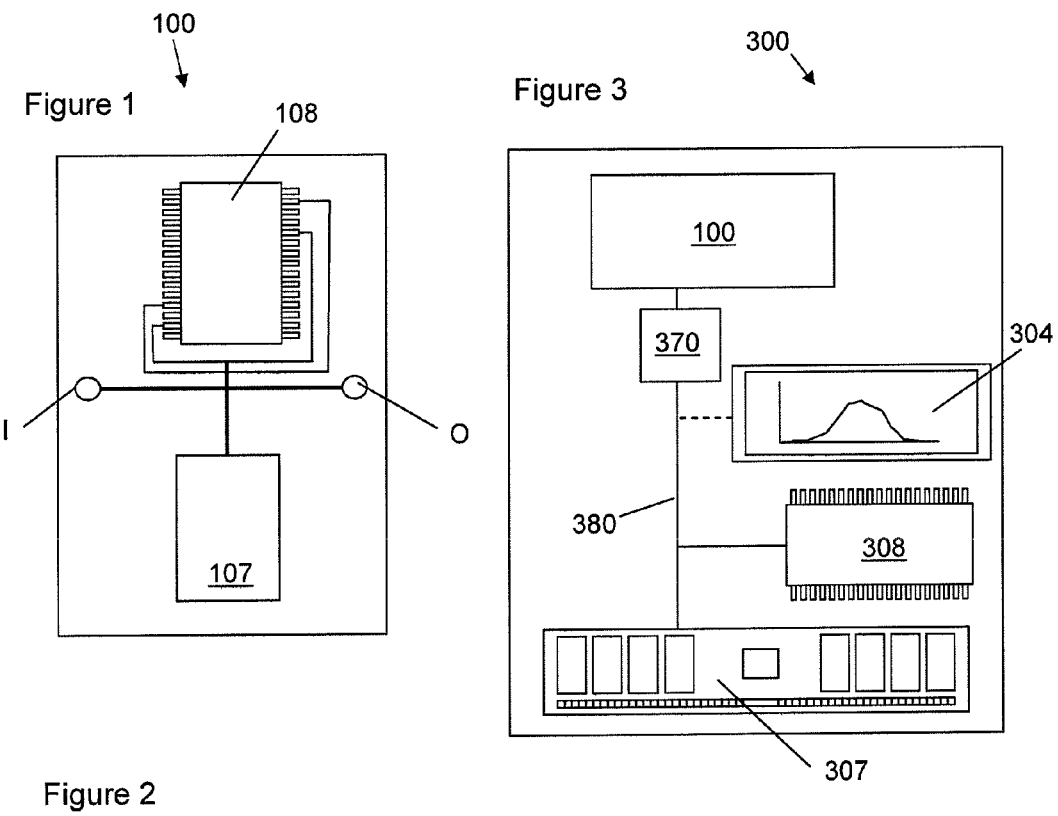
Figure 2
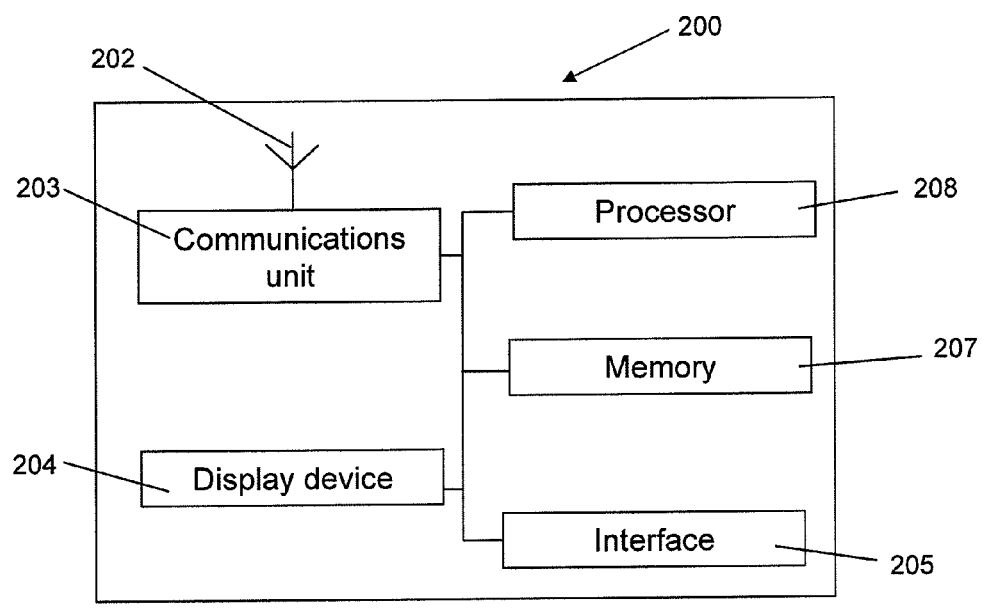

Figure 9
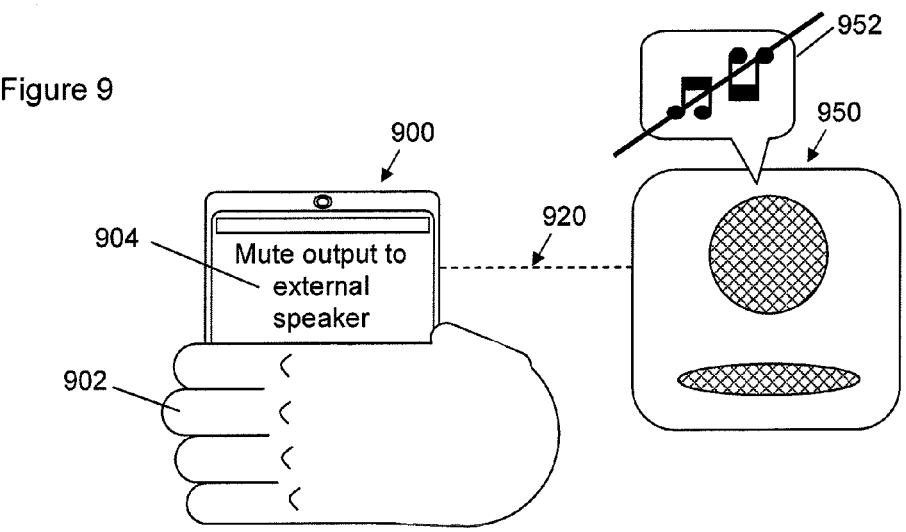
Figure 10
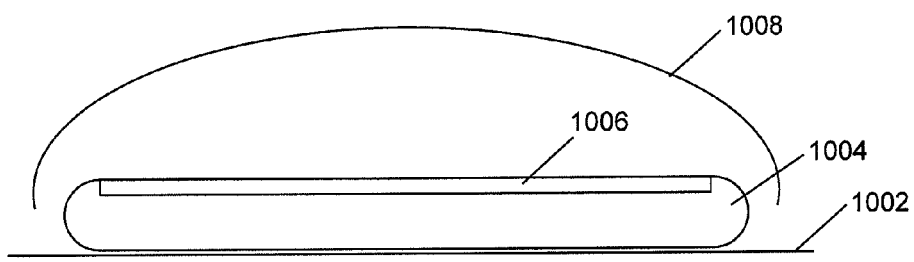
Figure 11
Using a determined user's grip of a portable electronic device as a user input to the portable electronic device to control data streaming functionality provided using the portable the portable electronic device. —1100
Figure 12
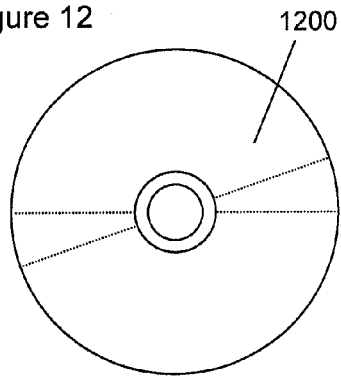

APPARATUS AND ASSOCIATED METHODS

TECHNICAL FIELD

The present disclosure relates to user interfaces, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Certain portable electronic devices allow data output and/or data input which takes place over a period of time, such as playing movies, playing music and other audio, facilitating telephone conversations and capturing video data for recording and/or transmission. A user may wish to pause or mute data input or output. For example he may wish to mute speech input during a telephone conversation.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect there is provided an apparatus, the apparatus comprising at least one processor and at least one memory including computer program code, the at least one memory and the computer program code configured, with the at least one processor, to cause the apparatus to perform at least the following: use a determined user's grip of a portable electronic device as a user input to the portable electronic device to control data streaming functionality provided using the portable electronic device.

For example, a user may be speaking to a friend using his smartphone. The user's grip on the smartphone may be determined, and the apparatus is able to use the determined user's grip to mute his speech input, for example to speak in private for a short while without the friend in the telephone conversation hearing what is said during the mute. A user's grip configured to cause audio input muting may be performed, for example by the user holding the smartphone with his hand such that the portion of the smartphone containing the microphone for audio input is covered/shielded by the user's palm. Another example of a voice uplink mute may be that, during a telephone call, the user's speech signal is filtered out due to a particular user grip, so that the person on the other side of the call hears only background noise and not the user speaking. This way, the person need not know that the caller has muted his speech (as he will continue to hear background noise).

Using the user's grip to control data streaming functionality may provide a user with an intuitive and simple way of controlling data streaming. It may be natural for a user to cover the mouthpiece area of a telephone during a telephone conversation in order to mute the audio input. Similarly, the user may grip a device to cover a camera to pause a video data uplink. It need not be the case that the input/output device associated with the data streaming is covered per se, but it is enough that a particular user grip is detected and associated with muting/pausing a particular data streaming process. The user grip may be related to the particular positioning of the user's palm, fingers and thumb, and/or may be related to the position to the grip at a particular place on the device. The apparatus uses the determined user grip, for example by using the determined detected shape of the user hand or hands, and the positioning of each finger and thumb in relation to the device, on the surface of the apparatus/device or in 3D around the proximity of the apparatus/device.

It may be advantageous for a user to control data streaming functionality simply by using a particular grip on the portable electronic device. For example, by using a user's grip as an input to the apparatus to control data streaming functionality, the user need not, for example, interact with a touch screen of a smartphone during a telephone/video chat conversation to change the mute settings, as a simple change of grip can be used to change the audio/video uplink/output and/or downlink/input. Further, for example, the user need not touch a camera to pause image/video stream upload, thus minimising the risk of making the camera lens dirty and removing any requirement for a particular sensor to be included or enabled for sensing whether the camera has been covered (i.e. the camera sensor itself could therefore detect grip).

The term "data streaming functionality" is intended to include all types of data input and data output which take place progressively over a period of time, whether they involve a remote input/output device or involve only a local apparatus/device.

For example, data output streaming functionality includes an apparatus/device providing output such as audio and video whether the source of the audio and video content is stored locally on the apparatus/device or remote from and accessible by the apparatus/device. Examples include listening to music stored on the apparatus/device, watching a movie from an internet site, listening to a person speak via a telephone call, and watching a live video stream in a video conference.

As another example, data input streaming functionality includes an apparatus/device accepting input, such as audio and video, whether the data is input for storage on the apparatus/device itself or for storage at a remote computing element accessible by the apparatus/device. Examples include a user speaking into a microphone of an apparatus/device during a telephone call to provide audio input for onward transmission, and a user recording a movie using a camera of an apparatus/device and storing the movie locally on the apparatus/device.

Data streaming functionality also includes uploading data to a remote computer element (such as uploading a user website or file to a server or cloud) and downloading data from a remote computing element (such as downloading a game, album or software update).

The apparatus may be configured to control data streaming functionality by controlling data streaming routing. For example a user may by able to play music using a portable electronic device. The music output may be controlled using a determined user's grip to be via a speaker built into the portable electronic device, or via a set of speakers which are paired with a controlling apparatus/device using Bluetooth, for example. The connection between the apparatus/device and an external device may be wired or wireless.

The apparatus may be configured to use the determined user's grip to control currently active data streaming functionality provided using the portable electronic device. Thus the apparatus is configured to operate during data input/uplink and output/download to control data streaming functionality.

The apparatus may be configured to use a particular position of the determined user's grip on the portable electronic device as the user input to selectively control the data streaming functionality provided using the portable electronic device. For example, a grip at the top portion of a device may pause video uplink, whereas a grip at the bottom portion of the device may mute audio input. As another example, a grip over or proximal to a speaker may be configured to mute audio output whether output from a speaker of the apparatus/device or attached to the apparatus/device, or via a pair of headphones connected to the apparatus/device. Audio output muting caused by a particular user grip may mute audio output from a plurality of audio-related applications, including a music player, a movie player, and during a telephone and/or video call, for example. As another example, a particular user grip may mute/pause two or more data streams so, for example, a grip over a display during a video call may pause both audio input and video input/upload. A different particular user grip in this example may mute both audio output/playback and video output.

The particular position of the user's grip of a portable electronic device may be one or more of: a user's grip at an end portion of the portable electronic device; a user's hands each gripping an end portion of the portable electronic device; a user's hand gripping a central portion of the portable electronic device and a user's hand gripping the portable electronic device in a vertical grip. Different grip positions may be associated with different user inputs. For intuitive use, an input relating to video input may be associated with a grip close to a video camera, or an input relating to an audio output may be associated with a grip over a speaker, for example. A vertical grip may be considered to be a grip in which the user's fingertips are located at a top edge/a short edge of the device and the user's thumb is located at the bottom edge/an opposing short edge of the device, such that the user's fingers and palm are located substantially over a front face or a back face of the portable electronic device.

The particular position of the user's grip of a portable electronic device may be one or more of: a grip proximal to a microphone of the portable electronic device; a grip proximal to a speaker of the portable electronic device; a grip proximal to a camera of the portable electronic device; and a grip proximal to a display of the portable electronic device. The user need not necessarily touch the input/output device or physically cover it/block it, because it is the detected user grip such as the finger placement on the device which is used as input to control data streaming functionality.

The apparatus may be configured to use a determined user's grip over a front face of the portable electronic device as the user input to control the data streaming functionality provided using the portable electronic device. The front face may be one or more of a face presented to a user for outputting a data stream (such as a face including a display screen for video output), a face comprising a data output device (such as a face comprising a display screen for visual output or a speaker for audio output), a face comprising a data input device (such as a face comprising a touch-sensitive display for user touch input or a microphone for audio input), and a face presented to the user during normal use of the portable electronic device. For example, a user may normally use a smartphone with the display screen facing the user.

The apparatus may be configured to use a determined user's grip of a portable electronic device and the orientation of the portable electronic device as a user input to the portable electronic device to control data streaming functionality provided using the portable electronic device. For example, a user may hold the device using a particular user grip. If the device is held in this particular grip in a vertical orientation (for example by a user holding the device upright while looking at the display) then one particular user input may be provided, such as mute audio output. If the user uses substantially the same particular user grip but the device is in a flat/horizontal orientation (for example, led on a tabletop) then a different particular user input may be provided, such as mute both audio output and audio input. In this way one particular user grip may be used to provide different user inputs dependent on the orientation of the device (as determined, for example, by an internal gyroscope of the device).

The apparatus may be configured to determine the user's grip. For example, the apparatus may comprise a 3-D capacitive sensing user interface configured to determine the position of the user's grip on and around the apparatus.

The data streaming functionality may comprise one or more of telephone calling, video calling, movie playback, audio playback, audio recording, video recording, data upload, and data download. For example, a user may be recording the audio input and output during a telephone call. A particular user grip made to the portable electronic device during the telephone call may mute the recording for the duration of the particular user grip so the telephone call can continue un-recorded.

Controlling the data streaming functionality may comprise one or more of muting an audio uplink from the portable electronic device, pausing a video uplink from the portable electronic device, pausing a data upload from the portable electronic device, muting an audio output from the portable electronic device, pausing video output from the portable electronic device, pausing a data download from the portable electronic device, controlling data input routing, and controlling data output routing.

The user's grip may be determined using one or more of a 3-D capacitive sensing user interface, a pressure detecting user interface, a touch sensitive user interface, a camera, a proximity sensor, an ambient light sensor and a pressure sensor, for example. A 3-D capacitive sensing user interface may be used to determine/map the position of the user's hand gripping the apparatus (or a device comprising the apparatus). This may involve detecting the user's hand, including detecting the position of individual gripping fingers, thumb and palm up to a particular distance away from the apparatus (for example up to 3 cm away). Detection of the user's hand/grip may include detection at the sides/edges and the back of the user interface. A pressure detecting user interface may include, for example, a pressure sensitive border around the edge of a portable electronic device configured to detect the presence of a user's fingers and thumb at particular locations around the border. A touch sensitive user interface may comprise a layer around the back and sides of a portable electronic device which is sensitive to contact with human skin, for example. A pressure sensor may be configured to determine the pressure with which the user applies a grip. Different pressures may be associated with different data streaming control. For example, a light/lower pressure grip may provide a "mute audio input" input, and a strong/higher pressure grip may provide a "mute audio input and video input" input to an apparatus/device.

Grip detection may in certain examples by performed substantially using one sensing device, such as via a 3-D capacitive sensing user interface, and may be assisted by one or more other sensors, such as a camera or pressure sensor, for example. An example of using a combination of sensing elements may be to use a touch sensitive layer around the front, back and sides of the apparatus/device, and a pressure-sensitive layer around the sides of the device. The device may be used to provide audio input via an in-built internal speaker and an externally connected speaker. If a user grips the apparatus/device with his fingers and thumb wrapped around in a strong fist-like grip, such that a higher pressure and larger region of hand contact with the device is determined, this may be received as a "full mute" input and cause the audio output to be muted both from the in-built speaker and the external speaker. If the user grips the apparatus/device lightly with his fingertips along one edge of the device, and thumb at the opposite edge of the device, such that a lower pressure and smaller region of hand contact with the device is determined, this may be received as a "partial mute" input and cause the audio output to be muted from the external speaker but not from the in-built speaker so audio playback continues from the in-built speaker only. This example may also apply if only one sensing element was used, such as only pressure-sensing or only touch-sensing.

The apparatus may be configured to provide an indication of the data streaming functionality controlled by the determined user's grip, the indication comprising one or more of a visual indicator, an audio indicator and a tactile indicator. For example, if an audio uplink is muted due to a particular user's grip, a symbol indicating the muting may be displayed on a region of a display which is determined not to be obscured by the user's grip. Such a symbol may be a microphone with a red line through it, for example. Other indicators include audio indicators such as a beep, tone, or spoken notice/indication, and tactile indicators such as haptic/vibration indicators or a change in a tactile user interface/surface such as a change in surface relief.

The portable electronic device may be configured to operate when connected to a peripheral device. For example, a user may connect a headset comprising a microphone and earpieces to the portable electronic device for conducting telephone calls. Other peripheral devices which may be attached to the portable electronic device include, a keyboard, a mouse, a speaker, a display, a video camera, a still/photographic camera, a microphone, and headphones, for example.

The data streaming functionality provided using the portable electronic device may be associated with one or more of an audio communication application (such as telephone connectivity), a video communication application (such as video calling capability), a movie application, an audio player application, a web browser and a game.

The apparatus may be configured to allow a user of the portable electronic device to calibrate the apparatus by storing one or more determined user grip positions on the portable electronic device, and associating a particular user grip position with a particular data streaming control. For example, the user may be able to use a calibration mode of the portable electronic device to hold the device in ways which feel natural to the user in particular scenarios, and store those grips as associated with particular user inputs for use later in controlling the data streaming functionality. A user may feel that holding the portable electronic device with his right palm over the bottom region of the display face is natural when wishing to mute any audio input, and so he may store this grip position for later use in muting audio input during telephone conversations, for example.

The apparatus may be configured to use the determined user's grip to control data streaming functionality to an external device over a wireless connection. For example, a smartphone may be connected via a Bluetooth connection to a microphone/headphones hands-free apparatus. The apparatus may be configured to use a determined user's grip of the smartphone to control data streaming functionality, for example to mute audio input to the microphone of the hands-free apparatus during a telephone call.

The apparatus may be the portable electronic device, a mobile telephone, a personal digital assistant, a tablet computer, a desktop computer, an e-book, a personal media player, a server, a microphone, a speaker, a display, a camera, or a module for one or more of the same.

According to a further aspect, there is provided a computer program comprising computer program code, the computer program code being configured to perform at least the following: use a determined user's grip of a portable electronic device as a user input to the portable electronic device to control data streaming functionality provided using the portable electronic device.

A computer program may be stored on a storage media (e.g. on a CD, a DVD, a memory stick or other non-transitory medium). A computer program may be configured to run on a device or apparatus as an application. An application may be run by a device or apparatus via an operating system. A computer program may form part of a computer program product.

According to a further aspect, there is provided a method, the method comprising using a determined user's grip of a portable electronic device as a user input to the portable electronic device to control data streaming functionality provided using the portable electronic device.

According to a further aspect there is provided an apparatus comprising means for using a determined user's grip of a portable electronic device as a user input to the portable electronic device to control data streaming functionality provided using the portable electronic device.

The present disclosure includes one or more corresponding aspects, embodiments or features in isolation or in various combinations whether or not specifically stated (including claimed) in that combination or in isolation. Corresponding means and corresponding function units (e.g. a user grip determiner, a data streaming controller) for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:

FIG. 1 illustrates an example apparatus comprising a number of electronic components, including memory and a processor according to an embodiment disclosed herein;

FIG. 2 illustrates an example apparatus comprising a number of electronic components, including memory, a processor and a communication unit according to another embodiment disclosed herein;

FIG. 3 illustrates an example apparatus comprising a number of electronic components, including memory, a processor and a communication unit according to another embodiment disclosed herein;

FIG. 9 illustrates a portable electronic device for use with a peripheral output device according to embodiments disclosed herein;

FIG. 10 illustrates a 3-D capacitive sensing device for use according to embodiments disclosed herein;

FIG. 11 illustrates an example method of the present disclosure; and

FIG. 12 illustrates schematically a computer readable medium providing a program.

DESCRIPTION OF EXAMPLE ASPECTS/EMBODIMENTS

Figure 4A:
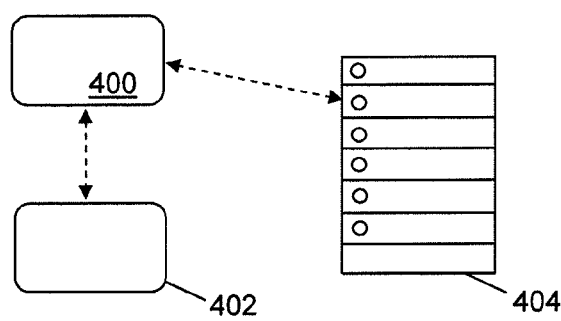
FIGS. 4a-4b illustrate an example apparatus in communication with a remote server/cloud according to another embodiment disclosed herein.

Certain portable electronic devices provide one or more types of data streaming functionality. An example is of a mobile telephone which is used to make calls. Audio data input is provided by the user speaking into the telephone, and audio output is provided from the other party in the call speaking which is transmitted to the user via a speaker. Another example of data streaming is of video conferencing. A user may provide video input using a video camera, and may receive video output from the other party via a display screen.

A user may wish to pause or mute data streaming for a period of time. For example he may wish to mute speech/audio input during a telephone conversation, pause video input during a video conference, or pause data downloading (for example, if downloading a music album). It may be possible to pause data streaming by choosing a "pause" or "mute" option on a portable electronic device using a dedicated button, a displayed virtual button, or by entering a menu system and choosing an appropriate option, for example. Muting and pausing in this way may not be trivial, as it requires a user to interact with a button or a displayed user interface (e.g., virtual button or menu). During a telephone conversation using a smartphone, it may be annoying or troublesome for a user to move the smartphone away from his ear during the conversation, find the "mute" button and select it to mute the audio. The user would need to find the "un-mute" button and reposition the smartphone for speaking and listening upon un-muting the call. If a user wanted to pause more than one data stream, for example video input and audio input, he may need to use further controls which may be more tiresome still.

Examples disclosed herein may be considered to provide a solution to one or more of the abovementioned issues. An apparatus is configured to use a determined user's grip of a portable electronic device as a user input to the portable electronic device to control data streaming functionality provided using the portable electronic device. By using a detected user grip as input (for example using the detected positions of the user's fingers, thumb and palm in relation to the detecting sensors/user interface of portable electronic device) a user input can be provided which is natural and intuitive for the user to perform and which does not necessarily require the user to break his concentration by moving the device and following on screen buttons or instructions to provide a desired input. Further in some examples, the user's grip may be detected even if the user is wearing gloves (for example using 3-D capacitive sensing) so then the user can provide input without being required to remove a glove to interact with a touch-sensitive screen for example. The user's grip at different locations on the portable electronic device may be associated with different user inputs, adding to the intuitive nature of using the user grip as an input. For example, holding a smartphone device over the microphone may be natural for a user wishing to mute the audio input, and similarly, gripping the smartphone over a camera may be natural for a user to pause video capture and/or uploading.

Other examples depicted in the figures have been provided with reference numerals that correspond to similar features of earlier described examples. For example, feature number 100 can also correspond to numbers 200, 300 etc. These numbered features may appear in the figures but may not have been directly referred to within the description of these particular examples. These have still been provided in the figures to aid understanding of the further examples, particularly in relation to the features of similar earlier described examples.

FIG. 1 shows an apparatus 100 comprising memory 107, a processor 108, input I and output O. In this embodiment only one processor and one memory are shown but it will be appreciated that other embodiments may utilise more than one processor and/or more than one memory (e.g. same or different processor/memory types).

In this embodiment the apparatus 100 is an Application Specific Integrated Circuit (ASIC) for a portable electronic device with a touch sensitive display. In other embodiments the apparatus 100 can be a module for such a device, or may be the device itself, wherein the processor 108 is a general purpose CPU of the device and the memory 107 is general purpose memory comprised by the device.

The input I allows for receipt of signalling to the apparatus 100 from further components, such as components of a portable electronic device (like a touch-sensitive display) or the like. The output O allows for onward provision of signalling from within the apparatus 100 to further components such as a display screen. In this embodiment the input I and output O are part of a connection bus that allows for connection of the apparatus 100 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single chip/circuit that can be installed into an electronic device. In other examples one or more or all of the components may be located separately from one another.

FIG. 2 depicts an apparatus 200 of a further example embodiment, such as a mobile phone. In other example embodiments, the apparatus 200 may comprise a module for a mobile phone (or other portable electronic device), and may just comprise a suitably configured memory 207 and processor 208. The apparatus in certain embodiments could be a portable electronic device, a laptop computer, a mobile phone, a Smartphone, a tablet computer, a personal digital assistant, a digital camera, a navigator, a server, a non-portable electronic device, a desktop computer, a monitor, or a module/circuitry for one or more of the same.

The example embodiment of FIG. 2, in this case, comprises a display device 204 such as, for example, a Liquid Crystal Display (LCD), e-Ink or touch-screen user interface. The display device 204 may be a bendable, foldable, and/or rollable flexible display. The display device 204 may be curved (for example as a flexible display screen or as a rigid curved glass/plastic display screen). The display device 204 (and/or the device 200) may be any shape, such as rectangular, square, round, star-shaped or another shape. A device such as device 200 configured for touch user input may be configured to receive touch input via a touch detected on a touch-sensitive screen, on a separate touch-sensitive panel, or on a touch sensitive front window/screen integrated into the device 200, for example. A touch-sensitive element may be any shape, and may be larger than a display screen of the apparatus/device in some examples. For example, a touch sensitive membrane/layer may be located over the display screen, around the edges of the device 200 and possibly around the back of the device 200. A touch sensitive membrane/layer may include holes, for example to be located over a speaker, camera or microphone of the device so as not to block/cover these input/output devices.

The apparatus 200 of FIG. 2 is configured such that it may receive, include, and/or otherwise access data. For example, this example embodiment 200 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example embodiment comprises a memory 207 that stores data, possibly after being received via antenna 202 or port or after being generated at the user interface 205. The processor 208 may receive data from the user interface 205, from the memory 207, or from the communication unit 203. It will be appreciated that, in certain example embodiments, the display device 204 may incorporate the user interface 205. Regardless of the origin of the data, these data may be outputted to a user of apparatus 200 via the display device 204, and/or any other output devices provided with apparatus. The processor 208 may also store the data for later use in the memory 207. The memory 207 may store computer program code and/or applications which may be used to instruct/enable the processor 208 to perform functions (e.g. read, write, delete, edit or process data).

FIG. 3 depicts a further example embodiment of an electronic device 300, such as a tablet personal computer, a portable electronic device, a portable telecommunications device, a server or a module for such a device, the device comprising the apparatus 100 of FIG. 1. The apparatus 100 can be provided as a module for device 300, or even as a processor/memory for the device 300 or a processor/memory for a module for such a device 300. The device 300 comprises a processor 308 and a storage medium 307, which are connected (e.g. electrically and/or wirelessly) by a data bus 380. This data bus 380 can provide an active coupling between the processor 308 and the storage medium 307 to allow the processor 308 to access the computer program code. It will be appreciated that the components (e.g. memory, processor) of the device/apparatus may be linked via cloud computing architecture. For example, the storage device may be a remote server accessed via the internet by the processor.

The apparatus 100 in FIG. 3 is connected (e.g. electrically and/or wirelessly) to an input/output interface 370 that receives the output from the apparatus 100 and transmits this to the device 300 via data bus 380. Interface 370 can be connected via the data bus 380 to a display 304 (touch-sensitive or otherwise) that provides information from the apparatus 100 to a user. Display 304 can be part of the device 300 or can be separate. The device 300 also comprises a processor 308 configured for general control of the apparatus 100 as well as the device 300 by providing signalling to, and receiving signalling from, other device components to manage their operation.

The storage medium 307 is configured to store computer code configured to perform, control or enable the operation of the apparatus 100. The storage medium 307 may be configured to store settings for the other device components. The processor 308 may access the storage medium 307 to retrieve the component settings in order to manage the operation of the other device components. The storage medium 307 may be a temporary storage medium such as a volatile random access memory. The storage medium 307 may also be a permanent storage medium such as a hard disk drive, a flash memory, a remote server (such as cloud storage) or a non-volatile random access memory. The storage medium 307 could be composed of different combinations of the same or different memory types.

Figure 4B:
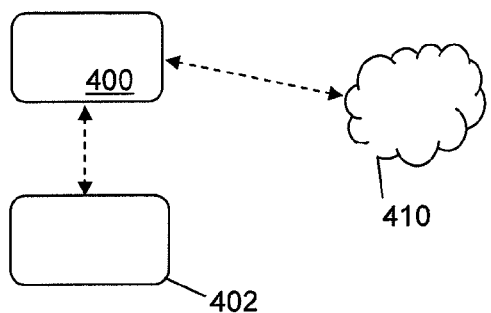

FIG. 4a shows an example of an apparatus in communication with a remote server. FIG. 4b shows an example of an apparatus in communication with a "cloud" for cloud computing. Such communication with a remote computing element may be via a communications unit, for example. In FIGS. 4a and 4b, the apparatus 400 (which may be apparatus 100, 200 or 300) is in communication with another device 402, such as a display, microphone, speaker, or camera. Of course, the apparatus 400 and device 402 may form part of the same apparatus/device, although they may be separate as shown in the figures.

FIG. 4a shows the remote computing element to be a remote server 404, with which the apparatus may be in wired or wireless communication (e.g. via the internet, Bluetooth, a USB connection, or any other suitable connection as known to one skilled in the art). In FIG. 4b, the apparatus 400 is in communication with a remote cloud 410 (which may, for example, by the Internet, or a system of remote computers configured for cloud computing). A portable electronic device may be configured to download data from a remote server 404 or a cloud 410. A user may use a determined user grip as input to, for example, pause the data download. As another example, a user may be conducting a video call with another party using a smartphone 400 via a remote server or bridge 404/410. A user may use a determined user grip as input to pause the video uplink to the call, or mute audio output from the other party speaking during the video call, for example.

Figure 5A:
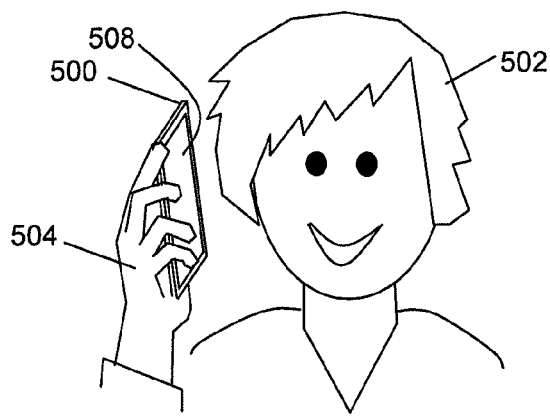
FIGS. 5a-5b illustrate a user holding a portable electronic device with different grips.
Figure 5B:
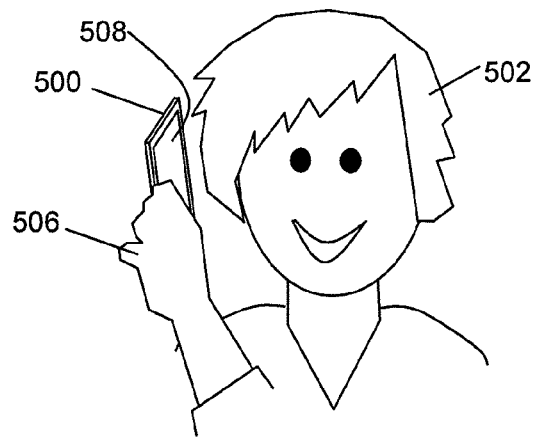

FIGS. 5a-5b illustrate an example of a user 502 holding a portable electronic device 500 such as a mobile telephone or smartphone during a telephone call. The portable electronic device 500 may be the apparatus or may comprise the apparatus. In FIG. 5a, the user is naturally holding the device 500 with his right hand 504 while speaking into the microphone of the device 500. The display 508 of the device is substantially uncovered. In FIG. 5b, the user 502 is muting his audio input so that the other party does not hear him during the mute.

As shown in FIG. 5b, to perform the mute, the user 502 has changed hands and is now holding the device 500 in his left hand 506 while it remains in the same place with respect to his head/listening ear. The user's grip of the device 500 with his left hand 506 positioned as shown with his palm covering the lower half of the device 500 is detected as a user input for use by the apparatus to control data streaming functionality provided using the portable electronic device and thereby mute the audio input. The apparatus/device 500 may also, for example, due to the user input provided by the user's grip 506 configured to mute audio input (e.g., by disconnecting or not transmitting reception from the microphone), and possibly play some music or provide some form of notification for the other party during the audio input mute so that the other party knows that he has not been cut off.

The user finds that holding the device 500 as shown in FIG. 5a is a natural way to hold the device 500 whilst speaking during the telephone call, and finds that holding the device as shown in FIG. 5b is a natural way to hold the device during the call while temporarily speaking to another person such that the other party in the telephone call cannot hear him. If the user moved back to using the grip shown in FIG. 5a from the grip shown in FIG. 5b he/the apparatus 500 may automatically un-mute the muted audio input and allow the user to continue his telephone call. The user is not required to interact with any options displayed on the screen 508 to perform the mute, as he may simply and naturally change his grip to perform the user input require to mute/un-mute the audio input.

The user input need not be made based only on a part of the device being covered. It is the detected user's grip, including the shape of the hand and proximity of the different parts of the hand (fingers/thumb) to the sensing elements which sense the grip which is taken as input. For example, covering the lower part of the display of a device using a palm with a thumb at one edge and fingers at another edge of the device, but not touching the display screen, may be detected as one particular user grip. Covering the lower part of the display of a device in a different way, by placing a thumb at the back of the device and placing the fingers flat against the display of the device to grip the device may be detected as a different particular user grip, even though both user grips cover substantially the same portion of the display of the device.

Figure 6A:
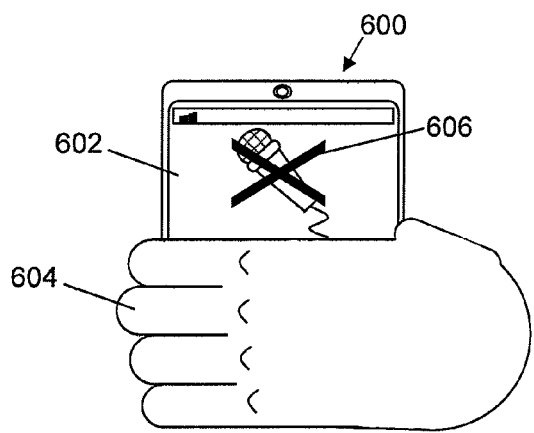
FIGS. 6a-6d illustrate user grips over portions of a portable electronic device used as user input according to embodiments disclosed herein.

FIGS. 6a-6d illustrate examples of a user's grip of a portable electronic apparatus/device 600 at different positions on the portable electronic device 600. The apparatus/device 600 in this example may be any device configured for data streaming which may be held in a hand, for example, a mobile telephone, a personal digital assistant, an e-book, or a personal media (music/video) player. The apparatus/device 600 is configured to use a determined user's grip of the portable electronic apparatus/device 600 at a particular position as a user input to the portable electronic apparatus/device 600 to selectively control data streaming functionality provided using the portable electronic apparatus/device 600. User grips in these examples are shown with the user's palm covering a portion of the display screen 602 of the apparatus/device 600. The user's grip in these examples is determined by the display screen 602 which has 3-D capacitive sensing functionality and can determine by the position and distance of objects such as fingers within approximately 3 cm of the display screen 604. Future detection limits may be able to detect objects further than 3 cm from the sensing element. FIG. 6a shows the user grip 604 over the lower portion of the apparatus/device 600 to cover a microphone built into the apparatus/device 600. The determined user's grip is used as user input by the apparatus/device 600 to provide audio input/uplink muting, for example during a telephone or video call. An indication of the muting caused by the determined user's grip 604 in this example is provided on the unobscured portion of the display 602 by a "no microphone" icon 606. The apparatus is able to determine the portion of the display which is unobscured from a determination of the position of the user's grip of the device 600 (and therefore a lack of grip over an unobscured display portion). Removal of the user's grip 604 from this position would cause the automatic un-muting of the audio input/uplink and the indicator 606 would no longer be displayed.

Figure 6B:
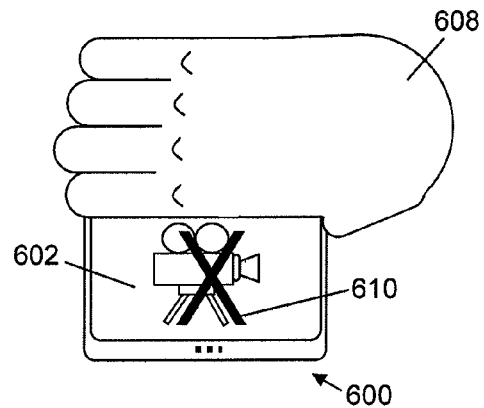

FIG. 6b shows the user grip 608 over the upper portion of the apparatus/device 600 to cover a camera built into the apparatus/device 600. The determined user's grip is used as user input by the apparatus to pause the video input, for example by switching off the video camera during video recording or a video conference call. The pausing in this example is indicated on the unobscured portion of the display 602 by a "no video camera" icon 610. Removal of the user's grip 608 from this position may cause the automatic recapturing of the video input, and the indicator 610 would no longer be displayed. Other examples of user input provided by a grip as shown in FIG. 6b include a downlink mute during a telephone or video call, or audio output mute during music playback.

Figure 6C:
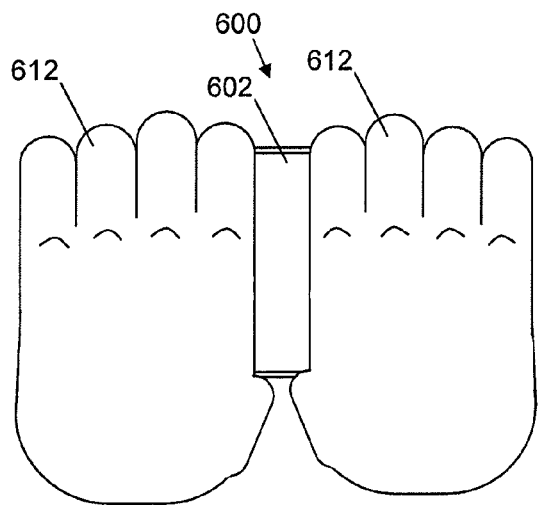

FIG. 6c shows the user's hands 612 each gripping an end portion of the apparatus/device 600 to cover the camera and the microphone built into the apparatus/device 600. This may be thought of as a "double grip". The determined user's grip is used as user input by the apparatus to both pause the video input and mute the audio input. In this example, no visual indicator is displayed to the user to indicate the video pausing and audio input muting, since there is little unobscured display screen 602 visible.

In certain examples such as that of FIG. 6c where the display is substantially covered, a pause/mute of a data stream may be indicated to the user by outputting audio feedback such as an audio tone, beep, or spoken feedback so the user is aware that a particular data stream is paused/muted due to the user's grip. Audio feedback may be particularly beneficial in the case of earpiece routing, for example if a user is using a portable electronic device with a hands-free accessory such as an earpiece of headphone/microphone headset.

In other examples a vibration indication may be provided, for example if the display screen is substantially obscured. If the portable electronic device has a tactile display or other tactile region (for example, a display/region which responds to user input by changing the feel or texture/surface relief of the display/region) then feedback may be from the tactile display/region so the user can feel that their grip of the device is providing a particular user input. This may be advantageous for users with poor eyesight or users who are using audio routing (for example, to a hands-free earpiece) who may find non-visual feedback more useful.

Removal of one hand of the user's grip 612 from the position shown in FIG. 6c may cause the corresponding paused/muted data stream to be re-started/un-muted. Other examples of user input provided by a double handed grip as shown in FIG. 6c include muting both a data uplink and a data downlink, such as muting audio input and audio output, or pausing data upload and data download, or pausing video uplink and visual/video output display on the screen.

Figure 6D:
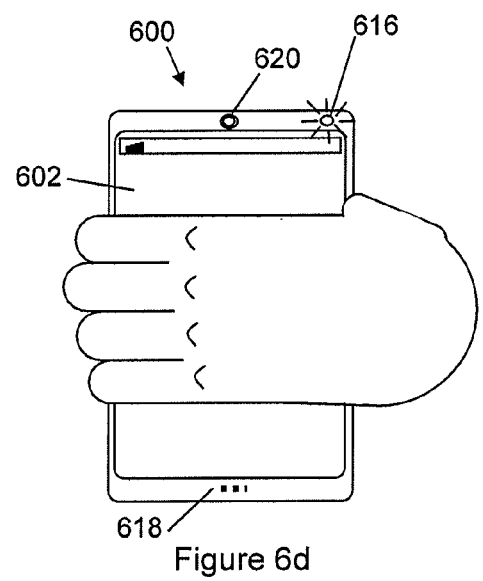

FIG. 6d shows the user hand 614 gripping a central portion of the apparatus/device 600. In this example, the microphone 618 and camera 620 are not covered. This user grip may be configured, for example, to cause a user input to pause a data download or data upload, such as downloading a song from a remote server or uploading a video to a website. In this example, an indicator light/LED 616 is flashing to indicate to the user that the data streaming is paused. Removal of the user's grip 614 from this position may cause the data streaming to automatically continue, and the indicator light 616 would stop flashing.

Figure 7A:
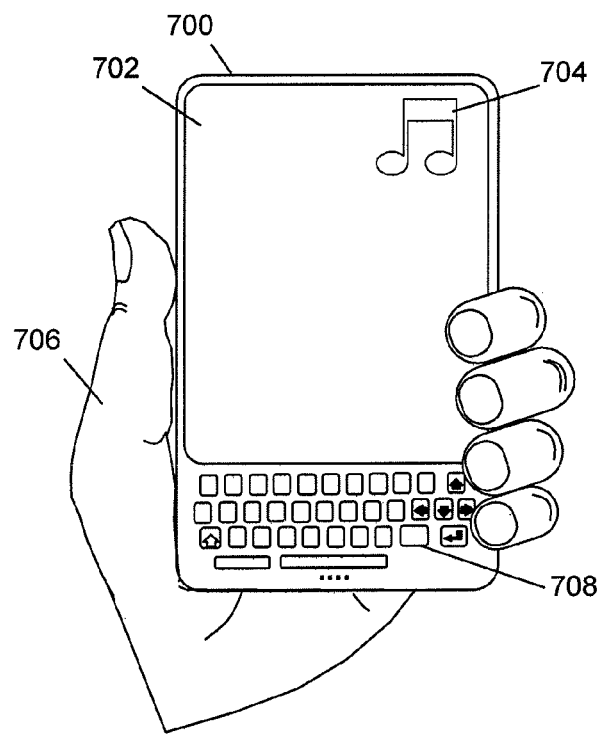
FIGS. 7a-7b illustrate user grips over portions of a portable electronic device used as user input according to embodiments disclosed herein.
Figure 7B:
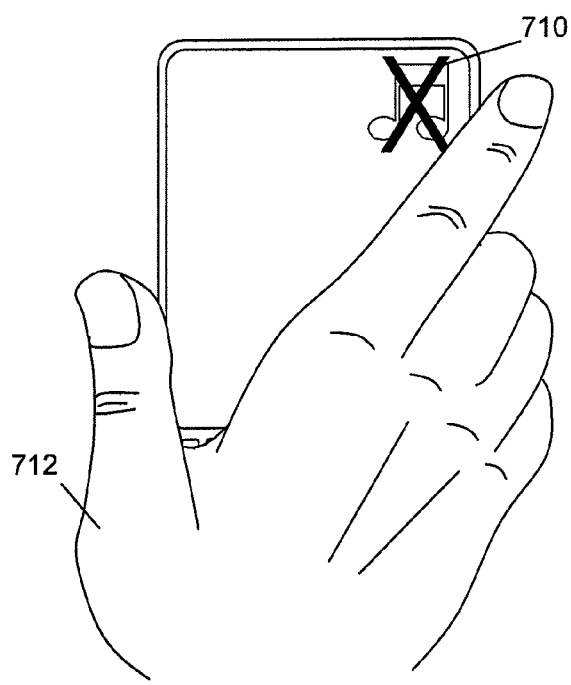

FIGS. 7a-7b illustrate examples of a user gripping a portable electronic apparatus/device 700 with a particular user grip to control data streaming. The apparatus/device 700 may be a mobile telephone, a personal digital assistant, or a personal media (music/video) player, for example. The apparatus/device 700 is configured to use a determined user's grip of the portable electronic apparatus/device 700 at a particular position as a user input to the portable electronic apparatus/device 700 to selectively control data streaming functionality provided using the portable electronic apparatus/device 700.

In FIG. 7a the user is listening to music played using the apparatus/device 700, as indicated on screen 702 by the music player icon 704. The user is holding the apparatus/device 700 in his left hand in a grip 706 with his thumb along one edge of the apparatus/device 700 and his fingers at the other edge of the apparatus/device 700, and his palm at the back of the apparatus/device 700 away from the display screen 702. The user wishes to pause the song being played and so changes his grip to that shown in FIG. 7b.

In FIG. 7b, the user is now gripping 712 the apparatus/device 700 in his right hand with his palm over the bottom portion of the display screen 702 and keyboard 708 at the front face of the apparatus/device 700. His thumb is at one edge of the apparatus/device 700 and his fingers are diagonally over a portion of the display 702 such that the bottom right corner portion of the display screen 702 is obscured. This particular user grip 712 has been pre-defined by the user so that, when this grip 712 is detected, it is taken as a user input to pause any audio output from the apparatus/device 700. Thus the music playback is paused, as indicated by the music mute icon 710. The particular user grip 712 shown in FIG. 7b has been stored in the apparatus/device 700 as a particular user input grip 712 and associated with the particular data streaming control of pausing audio output. When the user grip 712 shown in FIG. 7b is no longer detected then audio playback may be configured to resume, for example by the user moving his grip back to that shown in FIG. 7a. In other examples, the paused/muted input/output may not automatically resume by the removal of the particular user grip.

This example shows that audio/video output from a music player, such as an FM radio transmitter, Wi-Fi Direct, personal music player application, movie playing application or Internet video stream may be paused using user grips 712 on a device, and upon releasing the user grip the audio/video output may continue to play from the point at which it was muted. This may be true if audio/video is provided by a peripheral device such as an external display or loudspeaker. In other examples, an audio downlink during a telephone or video call may be muted by a particular user grip of a device, and releasing the grip may un-mute the audio downlink to the other party can be heard again.

Thus different user grips may be pre-defined, and stored for later use as particular user inputs. Because it is the user's grip which is used, including, for example, the positioning of the palm, fingers and thumb in relation to the grip detectors/sensors and the position of the user's grip of a particular portion/region of the portable electronic device, then a user may have greater flexibility is defining a series of particular user grips each corresponding to a particular input. For example, a user may be able to define a user grip for each of muting an audio uplink, pausing a video uplink, pausing a data upload, muting an audio output, pausing video output and pausing a data download.

Figure 8A:
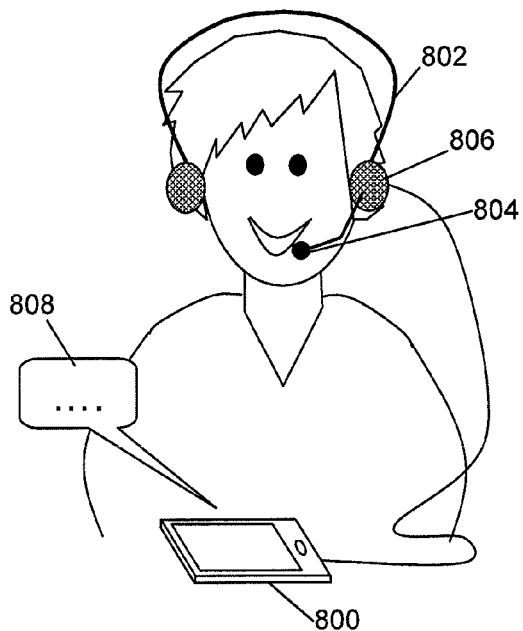
FIGS. 8a-8c illustrate a user using a portable electronic device with a peripheral device according to embodiments disclosed herein.
Figure 8B:
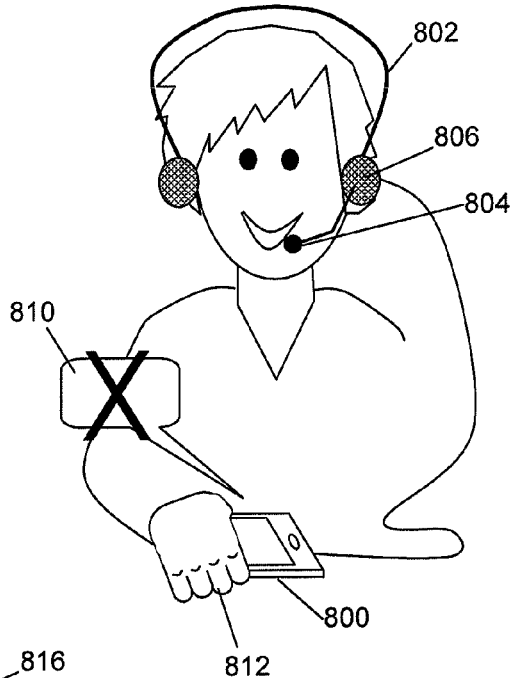

FIGS. 8a-8b illustrate examples of a user's grip of a portable electronic apparatus/device 700, which may be mobile telephone, a personal digital assistant, or a personal media (music/video) player. The apparatus/device 800 is connected to a hands-free headset 802 comprising earphones 806 and a microphone 804 so that the user can hold telephone and video calls without needing to hold the apparatus/device 800. The apparatus/device 800 is configured to use a determined user's grip of the portable electronic apparatus/device 800 at a particular position as a user input to the portable electronic apparatus/device 800 to selectively control data streaming functionality provided using the portable electronic apparatus/device 800 whilst connected to a peripheral device, the headset 802.

In FIG. 8a the user is conducting a telephone conversation using the apparatus/device 800 and headset 802. The user can provide audio input by speaking into the microphone 804, and can hear the other party speak 808 through the headphones 806.

In FIG. 8b, the user wants to mute the audio output 808 and so grips 812 the top portion of the apparatus/device 800. The apparatus/device 800 uses the determined user's grip 812 of the portable electronic device 800 as a user input to control data streaming functionality provided using the portable electronic device 800 and mute the audio output 810. While the grip 812 is detected by the apparatus/device 800, the user cannot hear the other party as indicated by the muted audio output 810.

Figure 8C:
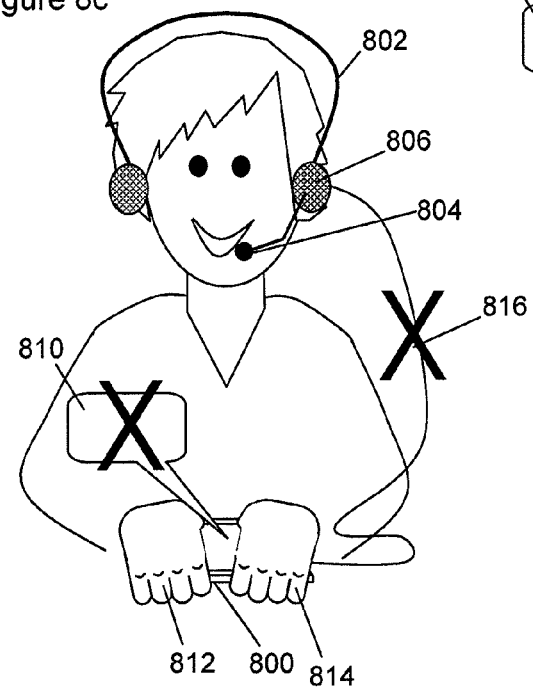

In FIG. 8c, the user also wants to mute the audio input and so he grips 814 the bottom portion of the apparatus/device 800. The apparatus/device 800 uses the determined user's grip 814 of the portable electronic device 800 as a user input to control data streaming functionality provided using the portable electronic device 800 and mute the audio input (mute the audio downlink 816). This may be useful for a user who, for example, is interrupted by another person during a telephone call and wants to listen to the other person for a while, or who wants to speak to another person without the person in the current telephone call hearing what they are saying. While the grip 814 is detected by the apparatus/device 800, the other party cannot hear the user as indicated by the muted audio input 816.

The user grips 812, 814 may have been previously stored on the portable electronic apparatus/device 800 to calibrate the device, so that they can be used later as shown in FIGS. 8b and 8c to provide user input and control the data streaming (in this example, by controlling audio input and output). The user may find using such grips to control data streaming to be a simple and intuitive way of providing user input. When controlling multiple different data streams, as in this example where both audio input and audio output are controlled, using grips 812, 814 may be provide a natural and easy way of providing user input, rather than, for example, interacting with different aspects of an on-screen user interface of the apparatus/device 800.

In FIGS. 6a-6d and 8a-8c, for example, while it is shown that the apparatus/device 600, 800 is in the user's hand or hands, this need not be the case. The device may be laid on a tabletop or desk, for example, and the apparatus is still configured to use a determined user's grip of the portable electronic device as a user input to control data streaming functionality. For example, a user may grip the device while the device is lying on the tabletop, and provide user input to control data streaming. An example is of using an apparatus/device during a hands-free conference call. The user may have an apparatus/device laid on the desk in front of him. To pause audio input he may cup his fingers over the bottom portion of the device to grip it while it is still laid on the tabletop, and by later removing his fingers, un-pause audio input and continue the conversation.

An example of controlling data routing is illustrated in FIG. 9. The apparatus/device 900 in this example is configured to use particular user grips of the device. The apparatus/device 900 can store and play music files, and may be a personal media player or smartphone for example. In this example, the apparatus/device 900 is configured to play music through an in-built/integrated speaker or via a connected external speaker 950. In other examples, the apparatus/device 900 may not have any such integrated speakers, and may require the use of an external speaker for audio output. In other examples, the apparatus/device 900 may be configured to play music (output audio) through both an in-built speaker and an external speaker at the same, or different times.

FIG. 9 illustrates a user with the apparatus/device 900 which is already paired over a Bluetooth connection 920 to an external speaker 950. Prior to the particular user grip 902 of the apparatus/device 900, the external speaker 950 was playing music from the apparatus/device 900 received over the Bluetooth connection 920. In this example, the user wants to temporarily mute the music output from the external speaker 950.

The user provides a particular user grip 902, which in this example is around the base of the portable electronic device 900. Due to the detected particular user grip 902, the apparatus/device 900 in this example automatically mutes the audio output 952 from the external speaker 950. Thus the apparatus/device 900 is configured to use the determined user's grip 902 to control data streaming functionality to an external device 950 over a wireless connection 920. The device 900 may provide feedback to the user to indicate the data streaming control being provided by the user's grip, such as a message "mute output to external speaker" 904 displayed on the unobscured portion of the display screen of the device 900.

In other examples, rather than mute the audio output from the external speaker 950 so that no music at all is output during the application of the particular user grip, the apparatus may be configured to use the particular user grip to mute the music/audio output from the external speaker 950 but provide the music/audio output from a speaker integrated in the apparatus/device 900. For example, if the user gripped the top portion of the apparatus/device 900, this may provide a mute from the external connected speaker 950 but may provide music output from an internal speaker of the apparatus/device 900.

If the user removes the particular user grip 902 which causes the muting of audio output 952 through the external speaker 950, the apparatus/device 900 is configured to un-mute the audio output from the external speaker 950, so that the music may continue to be played through the external speaker 950. In other examples, the music may not me muted but may be paused, so that after release of the particular user grip, the music continues to be output from the external speaker starting from the point at which the output was paused due to the particular user grip being made on the apparatus/device 900.

It will be appreciated that the control of data streaming output/input via an external device may be to headphones, a television, a microphone, a camera, or another external/peripheral electronic device, for example. Connections between the apparatus/device and an external/peripheral device for data routing may be wired or wireless (e.g. via WiFi or a wireless local area network (WLAN)).

In other examples, routing data input and/or data output related to data streaming may be controlled by using particular user grips. For example, a user may be using an in-built camera of a smartphone to take photographs or record a video. The smartphone may comprise two in-built cameras on opposite faces of the device. A particular user grip around the outward camera (the camera facing away from the user) may cause the apparatus/device to record images using the inward-facing camera (for example to record images of the user). A different particular user grip around the inward camera (the camera facing toward the user) may cause the apparatus/device to record images using the outward-facing camera (for example, to record the view which the user can see). A further particular user grip may pause video recording regardless of which camera is currently in use.

FIG. 10 illustrates one way in which the user's grip may be detected. The apparatus/device 1004 is shown resting on a tabletop 1002 with a display/user interface 1006 facing upwards. The apparatus/device 1004 is configured to determine the user's grip using a 3-D capacitive sensing user interface 1006. A 3-D capacitive sensing user interface may be considered to be 3-D map capable sensor technology, which can detect objects hovering within a predetermined distance within a capacitive field 1008 of the display, to make 3-D capacitive heatmaps/scanning images. These images can be used to identify the shape and size and location of, for example, a hand grip in 3-D space within the detection field 1008. The predetermined working distance in which objects may be detected may be up to 3 cm away from the surface of the display screen in certain examples. This sensing technology is also able to sense and determine the position of a user's hand at a distance from the screen even if he is wearing gloves, providing an advantage over, for example, a touch-sensitive screen which requires skin contact with the display screen.

When a user grips a device 1004 with such a 3-D capacitive sensing user interface 1006, the capacitive field 1008 changes. Touch controller algorithms can detect the user's hand position in relation to the display 1006 from changes in the capacitive field 1008. Another method is to transfer capacitive raw data to a host computer/processor from the apparatus/device 1004 and run a hand detection algorithm at the host. The capacitive raw data information can be transferred to the host from a touch controller interface of the apparatus/device 1004.

The capacitive sensing technology may be called 3-D touch, hovering touch or touchless touch, and may comprise the capacitive display 1006 of the device 1004 in communication with a host computer/processor. Even in the case of a flat display (e.g., one which may be considered to have one exposed plane as the screen of the device 1004), the capacitive field 1008 can detect objects such as fingers and thumbs at the edges/sides of the device 1004 and interface 1006 as it can detect objects at a distance away from a direction perpendicular to the exposed plane. Thus, a user's hand grip may readily be identified, because the user's palm, fingers and thumb will likely be detectable by the capacitive field 1008 even if they are at the edges and even at the back of the device 1004. In certain examples, the 3-D capacitive sensor need not be part of a display screen 1006, and may be integrated at any place of the device 1004, such as at the sides or on the back.

In general, the apparatus is configured to provide functionality as disclosed herein to a wide range of devices, including portable electronic devices such as mobile telephones, personal digital assistants, tablet computers, desktop computers, e-books, personal media players, servers, microphones, speakers, displays, cameras, or module for one or more of the same. Another example is of a personal communicator with a flip cover, in which the apparatus is configured to operate whether the flip cover is closed or open (the device may comprise sensing elements over the front of the flip cover to operate when the cover is closed, and sensing elements over a display screen which is exposed when the flip cover is opened). Another example is of a bendable/flexible device, in which the sensing elements are configured to detect the position of a user's grip while accounting for the current position of the current bent/flexed configuration of the device.

Other examples include devices comprising grip sensing elements located on more than one, or all, sides of a device for a complete sensing field in 3-D around the device. Other devices comprise grip sensing elements over one side of a device, such as a side including a display screen. Further devices may not have a display screen, and grip sensing elements may still be present to allow a user to provide user inputs and obtain data streaming control as disclosed herein. In examples where there is no display screen per se, an indicator light or lights, audio feedback and/or haptic feedback may be implemented to alert the user to any detected user inputs.

FIG. 11 illustrates a method according to an example embodiment of the present disclosure. The method comprises using a determined user's grip of a portable electronic device as a user input to the portable electronic device to control data streaming functionality provided using the portable electronic device 1100.

FIG. 12 illustrates schematically a computer/processor readable medium 1200 providing a program according to an embodiment. In this example, the computer/processor readable medium is a disc such as a Digital Versatile Disc (DVD) or a compact disc (CD). In other embodiments, the computer readable medium may be any medium that has been programmed in such a way as to carry out the functionality herein described. The computer program code may be distributed between the multiple memories of the same type, or multiple memories of a different type, such as ROM, RAM, flash, hard disk, solid state, etc.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

Any mentioned apparatus/elements/processor may have other functions in addition to the mentioned functions, and that these functions may be performed by the same apparatus/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to example embodiments thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   use a determined user's grip of a portable electronic device as a user input to the portable electronic device to control currently active data streaming functionality provided using the portable electronic device, the user grip comprising the particular positioning of the user's fingers and thumb, with respect to the position of the grip at a particular place on the device wherein the data streaming functions are selected from;
   muting an audio uplink from the portable electronic device;
   pausing a video uplink from the portable electronic device;
   pausing a data upload from the portable electronic device;
   muting an audio output from the portable electronic device;
   pausing video output from the portable electronic device; and
   pausing a data download from the portable electronic device.

2. The apparatus of claim 1, wherein the apparatus is configured to use a particular position of the determined user's grip on the portable electronic device as the user input to selectively control the data streaming functionality provided using the portable electronic device.

3. The apparatus of claim 2, wherein the particular position of the user's grip of a portable electronic device is one or more of:
   a user's grip at an end portion of the portable electronic device;
   a user's hands each gripping an end portion of the portable electronic device;
   a user's hand gripping a central portion of the portable electronic device; and
   a user's hand gripping the portable electronic device in a vertical grip.

4. The apparatus of claim 2, wherein the particular position of the user's grip of a portable electronic device is one or more of:
   a grip proximal to a microphone of the portable electronic device;
   a grip proximal to a speaker of the portable electronic device;
   a grip proximal to a camera of the portable electronic device; and
   a grip proximal to a display of the portable electronic device.

5. The apparatus of claim 4, wherein:
   a grip proximal to a microphone of the portable electronic device is configured to mute an audio uplink from the portable electronic device;
   a grip proximal to a speaker of the portable electronic device is configured to mute an audio output from the portable electronic device;
   a grip proximal to a camera of the portable electronic device is configured to pause a video uplink from the portable electronic device; and
   a grip proximal to a display of the portable electronic device is configured to pause video output from the portable electronic device.

6. The apparatus of claim 1, wherein the apparatus is configured to use a determined user's grip over a front face of the portable electronic device as the user input to control the data streaming functionality provided using the portable electronic device.

7. The apparatus of claim 1, wherein the front face is one or more of:
   a face presented to a user for outputting a data stream;
   a face comprising a data output device;
   a face comprising a data input device; and
   a face presented to the user during normal use of the portable electronic device.

8. The apparatus of claim 1, wherein the apparatus is configured to determine the user's grip.

9. The apparatus of claim 1, wherein the data streaming functionality comprises one or more of: telephone calling, video calling, movie playback, audio playback, audio recording, video recording, data upload, and data download.

10. The apparatus of claim 1, wherein the user's grip is determined using one or more of:
    a 3-D capacitive sensing user interface;
    a pressure detecting user interface; and
    a touch sensitive user interface.

11. The apparatus of claim 1, wherein the apparatus is configured to provide an indication of the data streaming functionality controlled by the determined user's grip, the indication comprising one or more of:
    a visual indicator;
    an audio indicator; and
    a tactile indicator.

12. The apparatus of claim 1, wherein the portable electronic device is configured to operate when connected to a peripheral device.

13. The apparatus of claim 1, wherein the apparatus is configured to allow a user of the portable electronic device to calibrate the apparatus by:
    storing one or more determined user grip positions on the portable electronic device; and
    associating a particular user grip position with a particular data streaming control.

14. The apparatus of claim 1, wherein the apparatus is configured to use the determined user's grip to control data streaming functionality to an external device over a wireless connection.

15. The apparatus of claim 1, wherein the apparatus is the portable electronic device, a mobile telephone, a personal digital assistant, a tablet computer, a desktop computer, an e-book, a personal media player, a server, a microphone, a speaker, a display, a camera, or a module for one or more of the same.

16. A non-transitory computer readable medium comprising computer program code stored thereon, the computer readable medium and computer program code being configured to, when run on at least one processor perform at least the following:
- use a determined user's grip of a portable electronic device as a user input to the portable electronic device to control data streaming functionality provided using the portable electronic device, the user grip comprising the particular positioning of the user's fingers and thumb, with respect to the position of the grip at a particular place on the device wherein the data streaming functions are selected from;
- muting an audio uplink from the portable electronic device;
- pausing a video uplink from the portable electronic device;
- pausing a data upload from the portable electronic device;
- muting an audio output from the portable electronic device;
- pausing video output from the portable electronic device; and
- pausing a data download from the portable electronic device.

17. A method comprising:
- using a determined user's grip of a portable electronic device as a user input to the portable electronic device to control data streaming functionality provided using the portable electronic device, the user grip comprising the particular positioning of the user's fingers and thumb, with respect to the position of the grip at a particular place on the device wherein the data streaming functions are selected from;
- muting an audio uplink from the portable electronic device;
- pausing a video uplink from the portable electronic device;
- pausing a data upload from the portable electronic device;
- muting an audio output from the portable electronic device;
- pausing video output from the portable electronic device; and
- pausing a data download from the portable electronic device.

* * * * *